Figure 1:
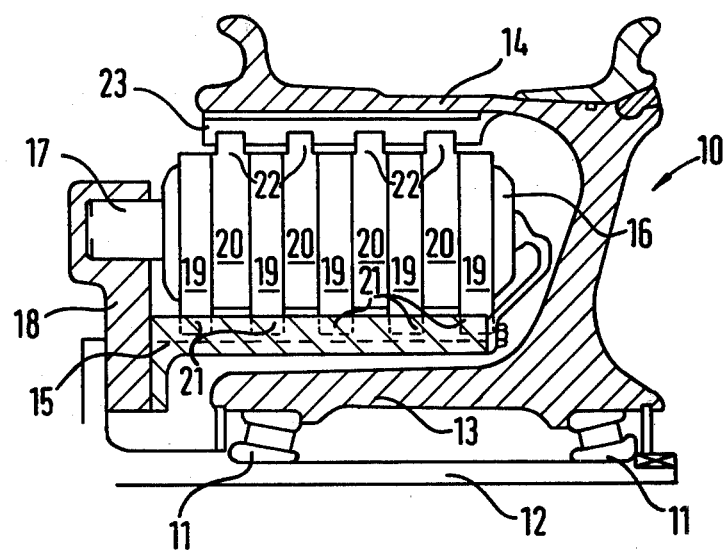

United States Patent [19]

Dowell et al.

[11] 4,149,617

[45] Apr. 17, 1979

[54] MULTI-DISC BRAKES

[75] Inventors: Frederick S. Dowell, Coventry; Benedict P. Healy, Wexford, both of England

[73] Assignee: Dunlop Limited, United Kingdom

[21] Appl. No.: 831,282

[22] Filed: Sep. 7, 1977

[30] Foreign Application Priority Data

Sep. 15, 1976 [GB] United Kingdom ............... 38162/76

[51] Int. Cl.² ............................................. F16D 65/12
[52] U.S. Cl. ............................ 188/218 XL; 188/73.2
[58] Field of Search ............. 188/71.5, 73.2, 218 XL; 192/107 R

[56] References Cited

U.S. PATENT DOCUMENTS

| 2,893,519 | 7/1959 | Martin ........................... 188/218 XL |
| 3,397,760 | 8/1968 | Robins et al. ............. 188/218 XL X |
| 3,759,354 | 9/1973 | Dowell et al. ................ 188/218 XL |

Primary Examiner—Duane A. Reger
Attorney, Agent, or Firm—Stevens, Davis, Miller & Mosher

[57] ABSTRACT

An annular friction element for a multi-disc brake comprises pads of friction material alternating around the element with radial arms by which the pads are clamped relative to a ring joining the arms, the arms being of greater extent than the ring radially of the element.

11 Claims, 4 Drawing Figures

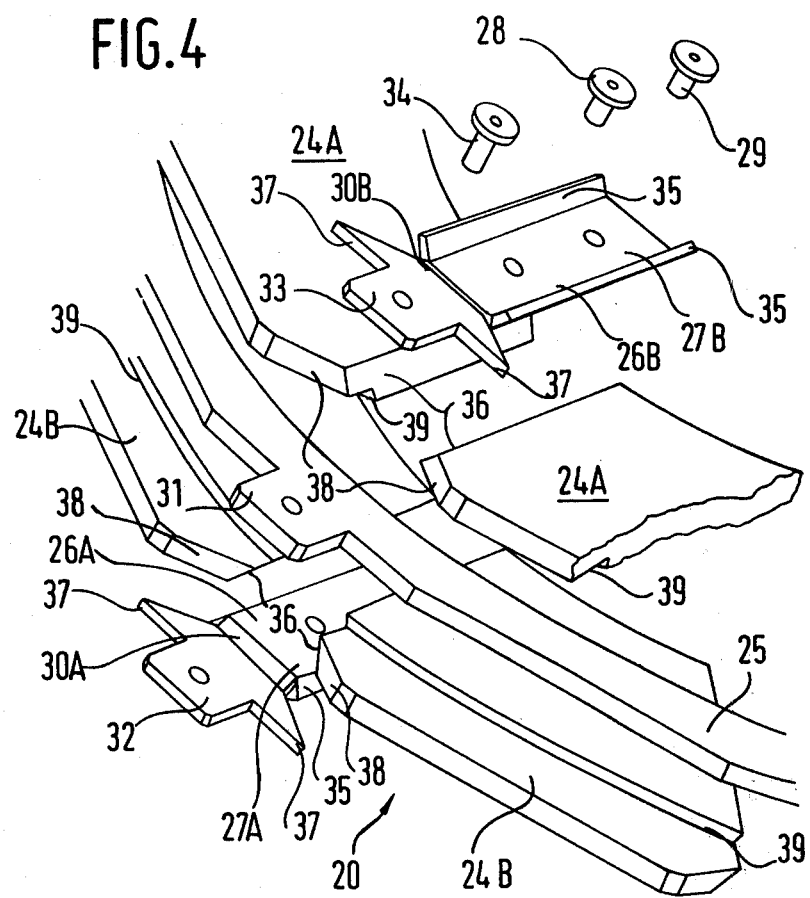

MULTI-DISC BRAKES

The present invention relates to improvements in multi-disc brakes and more particularly to an improved annular friction element to be interleaved with other annular friction elements to form the disc pack of a multi-disc brake in which alternate elements are rotors keyed to the wheel to rotate therewith and stators keyed to a torque tube stationary relative to the axle, all of the elements being displaceable axially relative to the wheel and torque tube so that by applying pressure at one end of the disc pack it may be brought into abutment with reaction means at its other end and the stators and rotors may be brought into mutual frictional engagement to apply the brake.

Multi-disc brakes of the above kind have been in use for some years, for example to brake the wheels of aircraft. In such situations the brake is required rapidly to convert high energy forces into heat and for this reason the individual stators and rotors must be capable of high energy absorption and resistance to thermal shock. The stators and rotors have therefore consisted of or comprised high energy absorption material such as carbon composite material. In addition to their thermal characteristics such materials have the advantage of being relatively light in weight but they have the disadvantage of being brittle and of relatively low strength.

The present invention relates to a friction element of the kind which comprises friction members or pads of such high energy absorption materials supported by a framework of relatively stronger materials, such as steel. An example of such a composite structure is described and claimed in the Complete Specification of the present assignee's British Pat. No. 1,378,886 and equivalent U.S. Pat. No. 3,759,354.

It is a principal object of the present invention to provide a friction element in the form of a composite structure in which the proportion of metal used is minimized without detriment to the structural strength and integrity of the element.

In accordance with the present invention there is provided an annular friction element comprising a support structure comprising a ring and a plurality of arms extending radially of the ring in circumferentially spaced relation so that at least a greater part of the length of each arm extends radially beyond the ring peripheries, the element additionally comprising a plurality of friction members located around the ring so that each occupies a space between adjacent arms, the arms and friction members being arranged and adapted so that the friction members are clamped relative to the ring by the arms.

The friction element is preferably a rotor and at least a greater part of the length of each arm preferably extends radially inwardly of the radially inner periphery of the ring.

Each arm preferably comprises two parts each having lateral portions to engage members on opposite sides of the arm, the arm being joined to the ring and the two parts being joined together so that a member on each side of the arm is clamped between lateral portions of the respective parts.

The two parts of the arm may have radially outer end portions which lie on opposite sides of the ring and are joined thereto by fixing means which extends through aligned holes in the said radially outer portions and in the ring. In this construction the ring may be formed with a radially outward projection lying between the radially outer portions of each arm and joined thereto by the fixing means, the assemblies of the projections and the associated end portions serving as drive keys extending radially outwardly of the element at circumferential intervals corresponding to those of the arms.

The two parts of each arm are preferably joined at contiguous web portions thereof disposed between two circumferentially adjacent friction members, each part having opposite lateral portions extending away from the web portions and outwardly of the elements at an acute angle to the plane of the web portion and said two friction members may have lateral edges adjacent the arm which are chamfered to fit beneath and be engaged by the lateral portions.

Each friction member is preferably dimensioned to span the space between two circumferentially adjacent arms and may receive the radially inner periphery of the ring in a recess in the radially outer edge of said member. Each member may comprise two halves divided in the plane of the ring, each half having a rebate in its radially outer edge to locate over a respective side of the ring. Adjacent lateral edge portions of the two halves of each member may be oppositely chamfered so that the lateral edges of the member taper toward the web portions of the adjacent arms.

The said radially outer end portions of the two parts of each arm may have lateral extensions extending circumferentially of the ring and overlapping the radially outer corner portions of the members.

Figure 2:
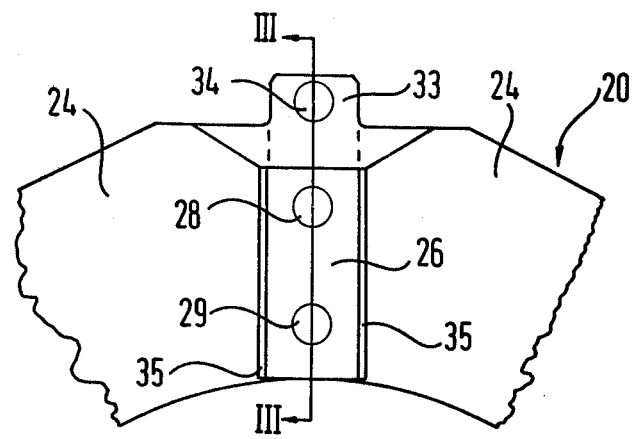
Figure 3:
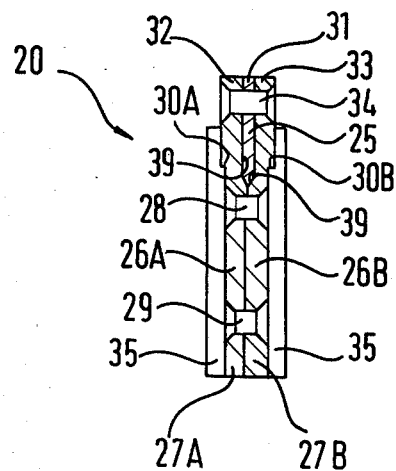

A preferred embodiment of the present invention will now be described with reference to the accompanying drawings, in which:

FIG. 1 is a side sectional elevation taken in a radial plane of the top half of a multi-disc brake assembly mounted in an aircraft wheel, FIG. 2 is a partial front elevation of a rotor in accordance with the invention, FIG. 3 is a cross-sectional view taken on the line III—III of FIG. 2, and FIG. 4 is an exploded perspective view of the rotor of FIGS. 2 and 3.

As shown in FIG. 1, an aircraft wheel 10 is rotatably mounted by bearings 11 on an axle tube 12. Between a hub portion 13 and a rim portion 14 of the wheel 10 a torque tube 15 projects inwardly of the wheel, being fixed at its outboard end relative to the axle tube 12 and having fixed to its free end an annular reaction member 16. An array of thrust devices, one of which is indicated at 17 is disposed circumferentially around a support 18 fixed relative to the axle tube 12 and between this and the reaction member 16 is a disc pack consisting of annular stator elements 19 interleaved with annular rotor elements 20. The stator elements 19 are keyed at 21 to the torque tube 15 and the rotors 20 are keyed at 22 to dogs such as 23 fixed in circumferentially spaced relation to the inner periphery of the rim 14 of the wheel so that the stators are axially slidable relative to the torque tube 15 and the rotors are axially slidable relative to the wheel 10 while being constrained by the keys against relative rotation.

To apply the brake the thrust devices, such as 17, are actuated to displace the pack of discs 19 and 20 toward the reaction member 16 so that they are brought into mutual frictional engagement.

FIGS. 2, 3 and 4 illustrate one of the rotor elements 20. This is a composite structure comprising friction pads or members 24 each made up of halves 24a and 24b divided in the median plane of the friction element.

These are supported by a steel structure which comprises a ring 25 from which arms 26 extend in circumferentially spaced relation. The greater part of the length of each arm 26 extends radially inwardly of the radially inner periphery of the ring 25. Each arm comprises two parts 26a and 26b which have flat, central longitudinal web portions 27a and 27b which are joined together in contiguous relation by rivets 28 and 29. At its radially outer end each arm half 26a and 26b is rebated as at 30a and 30b to pass on opposite sides of the ring 25. In alignment with each arm 26 the ring 25 is formed with a radially outward projection 31 and this is secured to the radially outer ends 32 and 33 of the arms halves by a rivet 34 passing through aligned holes in the ends 32 and 33 and the projection 31 therebetween.

Each arm part 26a and 26b has on opposite sides of its web portion 27a and 27b lateral portions 35 which extend at an acute angle away from the intervening web portion 27a or 27b outwardly of the friction element. The lateral edge of each pad half 24a and 24b is chamfered as at 36 to lie under a lateral portion 35 of an arm whereby the two halves 24a and 24b of each pad or member 24 are clamped together and held in position relative to the ring 25 by the arms 26.

Adjacent the rebates 30a and 30b the outer ends 32 and 33 of the parts 26a and 26b of the arms are formed with projections 37 which locate over chamfered, cutaway corner portions 38 of the friction member halves.

Each half 24a and 24b of each friction pad or member is formed in its radially outer edge with a rebate 39 dimensioned to fit over a respective side of the ring 25 when the two halves 24a and 24b of the member are in contact. In this way the ring 25 is fully recessed into the radially outer edge of each friction member 24 as is clear from FIG. 3.

The friction members or pads 24 are of a high energy absorption material resistant to thermal shock, such as carbon composite material. The support structure comprising the ring 25 and the arms 26 is of a stronger, less brittle material such as steel.

If desired the end portions 32 and 33 of the parts 26a and 26b of the arms may be split in a median plane to comprise an outer portion integral with the extensions 37 and an inner portion lacking such extensions and integral with the web portion 26a or 26b over the rebate 30a or 30b, the separable portion of each end portion of each arm part being held to the integral portion by the rivet 34.

Each projection 31 of the ring 25 and the associated arm end portions 32 and 33 jointly provide keys extending from the radially outer periphery of the annular assembly to engage drive dogs 23 (FIG. 1).

The stators 19 interleaved with the rotors 20 may be of any known, suitable construction.

Having now described our invention, what we claim is:

1. An annular friction element comprising a metal support structure having a ring and a plurality of arms extending radially of the ring in circumferentially spaced relation so that at least a greater part of the length of each arm extends radially inward beyond the ring inner periphery, the element additionally comprising a plurality of carbon composite friction members located around the ring so that each occupies a free space between adjacent arms on one side of the ring, the friction members being immovably clamped relative to the ring by the arms, projections on the ring extending radially outwardly therefrom in alignment with the arms to constitute circumferentially-spaced torque-transmitting formations of the element.

2. An element as claimed in claim 1 in the form of a rotor, wherein at least a greater part of the length of each arm extends radially inwardly of the radially inner periphery of the ring.

3. An element as claimed in claim 1 wherein each arm comprises two parts each having lateral portions to engage members on opposite sides of the arm, the arm being joined to the ring and the two parts being joined together so that a friction member on each side of the arm is clamped between lateral portions of the respective parts.

4. A rotor element to be interleaved with stator elements in a multi-disc brake assembly, the rotor comprising a ring, a plurality of arms extending radially of the ring in circumferentially spaced relation, a greater part of the length of each arm extending radially inwardly of the radially inner periphery of the ring, each arm having two parts on opposite sides of the ring, a plurality of carbon composite friction members located around the ring in the free spaces between the arms, the edges of the friction members adjacent each arm being clamped between the two parts of the arm to hold the friction members relative to the arms and ring, the ring having radially outward projections at circumferential intervals corresponding to the arms, the two parts of each arm extending radially outwardly of the ring on opposite sides of the associated projection, means securing the projections and the associated extensions of the arm parts together to form drive keys extending radially outwardly of the ring in circumferentially spaced relation.

5. An element as claimed in claim 4 wherein the two parts of each arm are joined at contiguous web portions thereof disposed between two circumferentially adjacent friction members, each part having opposite lateral portions extending away from the web portions and outwardly of the elements at an acute angle to the plane of the web portion and wherein said two friction members have lateral edges adjacent the arm which are chamfered to fit beneath and be engaged by the lateral portions.

6. An element as claimed in claim 1 wherein each friction member is dimensioned to span the space between two circumferentially adjacent arms, each friction member having a recess in the radially outer edge thereof to receive the radially inner periphery of the ring.

7. An element as claimed in claim 6 wherein each member comprises two halves divided in the plane of the ring, each half having a rebate in its radially outer edge to locate over a respective side of the ring.

8. An element as claimed in claim 7 wherein adjacent lateral edge portions of the two halves of each member are oppositely chamfered so that the lateral edges of the member taper toward the web portions of the adjacent arms.

9. An element as claimed in claim 4, wherein the said radially outer end portions of the two parts of each arm have lateral extensions extending circumferentially of the ring and overlapping radially outer corner portions of the members.

10. An annular friction element comprising a support structure having a ring and a plurality of arms extending radially of the ring in circumferentially spaced relation so that at least a greater part of the length of each arm extends radially beyond the ring peripheries, the element additionally comprising a plurality of carbon composite friction members located around the ring so that each occupies a free space between adjacent arms, the friction members being clamped relative to the ring by the arms, each friction member being dimensioned to span the space between two circumferentially adjacent arms, each member comprising two halves divided in the plane of the ring, each half having a rebate in its radially outer edge to locate over a respective side of the ring so that the two halves, when assembled on the ring, have a recess which receives the ring.

11. An element as claimed in claim 10 wherein adjacent lateral edge portions of the two halves of each member are oppositely chamfered so that these lateral edges taper toward the web portion of the adjacent arms.

* * * * *